Patented Dec. 19, 1944

2,365,297

UNITED STATES PATENT OFFICE 2,365,297

TREATMENT OF PLASTIC MATERIAL

Ernest Schweizer, East Orange, N. J., assignor, by mesne assignments, to Celanese Corporation of America, a corporation of Delaware No Drawing. Application October 14, 1940, Serial No. 361,101

20 Claims. (Cl. 117—144)

This invention relates to the treatment of cellulose derivative sheet material to improve the characteristics thereof, and relates more particularly to the treatment of said derivatives of cellulose to inhibit the formation of fog thereon.

An object of my invention is to treat the surfaces of cellulose derivative materials to render them more resistant to fogging or clouding under various atmospheric conditions.

Another object of my invention is to treat said surfaces so that the anti-fogging characteristics imparted thereto will be more lasting.

A further object of my invention is to treat said surfaces so as to make them less tacky and to prevent "blocking."

Other objects of my invention will appear from the following detailed description.

Transparent derivatives of cellulose are used for a wide variety of purposes. In some instances, these materials are used for purely decorative purposes but in general they are used where flexibility, shock resistance and a high degree of transparency are desired. Thus cellulose derivatives may be used for film bases, lenses, windows, transparent packaging materials, and the like. However, when these materials are used as lenses or windows and exposed to certain atmospheric conditions they have a tendency to become fogged. If, for example, the air on one side of the material is at a temperature below the dew point of the air on the opposite side, the cooling effect of the colder air causes a condensation of moisture on the warmer side and seriously interferes with visibility due to the presence of the condensed droplets of moisture. Such fogging is particularly serious when it occurs on a gas mask lens or an eye-piece since high visibility and the absence of distortion is essential.

Numerous suggestions have been made for overcoming the fogging characteristics of cellulose derivative materials such as coating the materials with gelatin, glycerine, etc. While these treatments improve the characteristics of the cellulose derivative materials to some degree, the method used to obtain the improved characteristics and the relative impermanence of the improvement leaves much to be desired.

I have now discovered that fog-resisting properties may be imparted with a high degree of permanence to surfaces of shaped cellulose derivatives when said cellulose derivatives are treated with a solution of an organic wetting or surface active agent in an organic solvent. Especially advantageous results are obtained in the case of heavy cellulose derivative sheet materials if they are treated while the cellulose derivative sheet still retains some non-permanent residual solvent which has been used in their manufacture. In the case of thin films and foils it is preferable to treat fully seasoned material which no longer contains non-permanent residual solvent. Derivatives of cellulose treated in this manner possess improved anti-fogging characteristics which are highly resistant to heat treatment, washing, and the wet and dry wiping of the treated articles.

While this invention is applicable to the production of any and all articles having a basis of a derivative of cellulose where fogging is undesirable, it is of special importance in the preparation of non-fogging derivative of cellulose sheet material and particularly sheet material to be used as lenses or eye-pieces in goggles, gas masks and the like.

Cellulose derivative sheet material may be manufactured in numerous ways. Films may be cast from solutions, while thicker sheets may be cut from solid blocks or else extruded in the desired thickness and width. In order to mix, gelatinize and perform other operations on the derivatives of cellulose, solvents of varying degrees of volatility and solvent action are usually employed. A certain amount of these volatile solvents are permanently retained in the body of the derivative of cellulose materials. However, the major proportion of volatile solvent diffuses through the structure after a time and volatilizes, e. g., by seasoning, and therefore the major proportion of volatile solvent is non-permanent. This is in contrast to any plasticizers which may be incorporated in the materials, which plasticizers have much higher boiling points than the volatile solvents and are permanently retained within the material, even after long periods of seasoning. Examples of such volatile and relatively non-permanent solvents or liquids are ether, methyl alcohol, ethyl alcohol, butyl alcohol, ethyl acetate, ethyl methyl ketone, acetone, mixtures of acetone and ethyl or methyl alcohol, chloroform, ethylene dichloride, mixtures of ethylene dichloride and ethyl or methyl alcohol, mixtures of methylene chloride and ethyl or methyl alcohol and similar solvents and solvent mixtures. In accordance with my invention, the treatment of the heavier derivative of cellulose sheet materials with solutions of wetting agents to impart anti-fogging characteristics to said derivatives of cellulose is preferably carried out while some residual non-permanent solvents are still retained in the structure of the cellulose derivative which is being treated, while with films, foils and the like, the treatment is preferably carried out on fully seasoned materials.

In addition to the volatile solvents used to aid in forming cellulose derivative sheet material, various plasticizers and softening agents may also be incorporated therein to render said sheet material permanently flexible. The amount and nature of the plasticizer or plasticizers used is determined by the particular use for which said cellulose derivative sheet material is prepared, as is well understood in the art. Examples of some suitable plasticizers are camphor, tricresyl phosphate, triphenyl phosphate, dimethyl phthalate, diethyl phthalate, dibutyl phthalate, dibutyl tartrate, ethyl toluene sulfonamide, ethyl phthalyl, ethyl glycollate, triacetin and dimethoxy ethyl phthalate.

The wetting or surface-active agents applied to the surfaces of the sheet material may be of numerous types. These wetting agents which have a high degree of wetability may be broadly classed as fatty alcohol sulfates, sulfated fatty acid esters, secondary alcohol sulfates, sulfated esters of higher alcohols and dibasic acids, alkyl aryl sulfonates, and sulfonated esters of alcohols and dibasic acids. While these classes are generally suitable, I preferably use the sulfonated esters of alcohols and dibasic acids as anti-fogging agents. Particularly suitable anti-fogging agents are the sulfonated esters of an alcohol and a dibasic acid such as the dioctyl ester of sodium sulfo-succinate and the salts of a homologous series of alkyl aryl sulphonates known as "Santomerse, D." These agents may be applied to the cellulose derivatives in various ways as by beading, dipping, brushing or spraying. Since they are generally solids, the wetting agents are applied dissolved in a solvent which is fairly volatile and which may have a degree of solvent or softening power for the base of the sheet material being treated. Where the cellulose derivative sheet material is thin, such as foil, it is preferable to use as a solvent for the wetting agent a liquid which is a non-solvent for the cellulose derivative base so as not to destroy, injure or crinkle the foil because of excessive solvent action. The solvents used may be those volatile solvents or solvent mixtures which are used in mixing the derivative of cellulose, as mentioned above, in which the wetting agents are soluble, or they may be such solvents as pentane, toluene, etc., which are non-solvents for the derivatives of cellulose. Preferably, however, I use acetone as a solvent for applying the wetting agent to the surface of the derivative of cellulose sheet material being treated where the sheet material is of substantial thickness. If desired, dyes or suitable coloring matter may be added to the solution of the wetting agent.

In order further to illustrate my invention, but without being limited thereto, the following examples are given:

*Example I*

A roll of cellulose acetate film of 0.010 inch in thickness is cast by the usual casting technique from a solution containing 100 parts by weight of cellulose acetate, 30 parts of a mixture of equal parts of ethyl phthalyl ethyl glycollate and triphenyl phosphate and 400 parts of acetone. The stripped film is given an anti-fogging treatment as follows. A solution of 1 part by weight of the dioctyl ester of sodium sulfo-succinate is prepared by dissolving it in 100 parts of commercially pure acetone. This solution is beaded on to the roll of cellulose acetate film and the acetone allowed to volatilize off leaving a uniformly thin deposit of the wetting agent imbedded in the surface of the treated film.

The seasoned film has excellent anti-fogging characteristics which are comparatively permanent. When moisture condenses on the surface of the treated film the transparency remains unaffected. In addition, these anti-fogging characteristics are not seriously affected when the film is subjected to the action of running water, dry wiping, or heating. The discoloration obtained by heating the film for 3 minutes at 135° C. is no greater than that obtained by heating ordinary untreated film.

*Example II*

A cellulose acetate sheet 0.10 inch in thickness is cut from a cake or block in the manner well known in the cellulose plastic art. The composition is composed of 100 parts by weight of cellulose acetate, 20 parts of diethyl phthalate and 10 parts of triphenyl phosphate and contains about 10 to 20% of a mixture of 75% ethyl methyl ketone and 25% acetone which is non-permanent residual solvent. The sheets are held between cardboard or so called "falulah" pads and are subjected to a preliminary seasoning in blowers for 24 hours at a temperature of 80° F. The sheets are removed, wiped clean and dipped for 20 seconds in a 1 to 2% solution of the dioctyl ester of sodium sulfo-succinate in acetone. The sheets are then dried in air for 12 hours at room temperature and placed again between the falulah pads and blower-seasoned for 24 hours at 90° F., then 48 hours at 120° F., followed by 125 hours at 160° F. The sheets are removed from the cardboard pads and wiped. The sheets are then polished in a press for 30 minutes at 175 lbs. hydraulic pressure per square inch of stock and a temperature of 270° F., care being taken to avoid excessive flow due to the surface slipperiness imparted to the stock by the anti-fogging agent.

These polished sheets may then be fabricated or shaped into numerous articles such as aircraft, windows, gas masks or goggle lenses, etc., all of which have anti-fogging characteristics which have a long life even after wiping and exposure to the action of the elements. This durable or lasting effect may be explained by the fact that the wetting agent penetrates into the gelatinized cellulose derivative base, becoming an intimate protected part thereof. Plastic sheets processed in this manner also show less tendency to develop so called "knife lines," when heated to softening temperatures or exposed to solvent vapors, thereby insuring a superior, more permanent surface finish.

*Example III*

A "Celluloid" film 0.005 inch in thickness, containing 25 parts of camphor to 100 parts by weight of cellulose nitrate and a small amount (less than 5%) of residual solvent is surface treated by coating with a solution of one percent "Santomerse D" dissolved in a solvent or solvent mixture of just sufficient solvent action to insure a slight gelatinization of the "Celluloid" surface, thereby allowing an adequate penetration or anchorage of the wetting agent into the film surface. Such a solvent mixture may be, for example, acetone 25%, ethyl acetate 25% and ethyl alcohol 50%, the proportions being by volume.

The dried seasoned film will be found resistant to fogging or misting caused by condensation of moisture on the cooled surface.

Any cellulose derivative is suitable for the preparation of anti-fogging sheets and films. Cellulose esters such as cellulose nitrate, cellulose acetate, cellulose propionate, cellulose butyrate, mixed esters as cellulose acetate-propionate, cellulose acetate-butyrate and cellulose acetate-phthalate are suitable, while cellulose ethers as ethyl cellulose, methyl cellulose and benzyl cellulose are also suitable for use according to my process.

Not only does the application of wetting agents to the surfaces of cellulose derivatives inhibit their tendency to fog under certain atmospheric conditions, but these surface tension reducing agents may also be used to affect the electrical characteristics of cellulose derivatives. When applied to the surfaces of cellulose derivatives in the manner described, many of these agents show marked activity in preventing the development of charges of static electricity on the surface of the cellulose derivative materials. The following example is illustrative:

*Example IV*

Cellulose acetate foil 0.001 inch in thickness, containing 10 parts of dibutyl phthalate to 100 parts of cellulose acetate by weight is dipped in a bath or "beaded" with a mixture of 10 grams of "Santomerse D" (an alkyl aryl sulphonate) in one liter of a mixture consisting of 80 parts of pentane and 20 parts of toluol by volume. If high humidity causes precipitation of the wetting agent, this may be remedied by the addition of a small amount of "high boiler" such as 2 cc. of butanol to one liter of solution. Other methods of applying the wetting agent into and on the surface of the stock such as by spraying, burnishing, preferably when the film still retains some small amount of solvent, are also effective.

Foil treated as above will be found not only anti-static but also anti-fogging in character. Furthermore, foils, films and sheets coated with such wetting agents are also markedly improved in respect to tackiness, i. e. they become less sticky and possess a much desired slippery action when passed through slitting and wrapping machines minimizing tears and "blocking" or sticking together of sheets or films when stacked upon each other or stored into roll form.

When the term "solution of a derivative of cellulose" is referred to in the claims it is to be construed as embracing plastic masses containing cellulose derivatives and volatile solvents therefor, such as, for example, the sheets cut from the block in Example II.

It is to be understood that the foregoing detailed description is merely given by way of illustration and that many variations may be made therein without departing from the spirit of my invention.

Having described my invention, what I desire to secure by Letters Patent is:

1. Method of producing material having anti-fogging and anti-static properties, which comprises treating a surface of non-fibrous derivative of cellulose material selected from the group consisting of cellulose esters and cellulose ethers with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent having at least a softening action on said derivative of cellulose material.

2. Method of producing material having anti-fogging and anti-static properties, which comprises treating a surface of non-fibrous derivative of cellulose material selected from the group consisting of cellulose esters and cellulose ethers, containing residual non-permanent solvent employed in the manufacture thereof, with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent while some non-permanent solvent is still present in said derivative of cellulose.

3. Method of producing material having anti-fogging and anti-static properties, which comprises treating a surface of non-fibrous derivative of cellulose material selected from the group consisting of cellulose esters and cellulose ethers with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent having some solvent action on said derivative of cellulose.

4. Method of producing material having anti-fogging and anti-static properties, which comprises treating a surface of non-fibrous derivative of cellulose material selected from the group consisting of cellulose esters and cellulose ethers, containing residual non-permanent solvent employed in the manufacture thereof, with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent having some solvent action on said derivative of cellulose while some non-permanent solvent is still present in said derivative of cellulose.

5. Method of producing sheet material having anti-fogging and anti-static properties, which comprises treating the surface of a thin film of a derivative of cellulose selected from the group consisting of cellulose esters and cellulose ethers with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent having some solvent action on said derivative of cellulose.

6. Method of producing sheet material having anti-fogging and anti-static properties, which comprises treating the surface of a thin film of a derivative of cellulose selected from the group consisting of cellulose esters and cellulose ethers with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent having at least a softening action on said derivative of cellulose.

7. Method of producing material having anti-fogging and anti-static properties, which comprises treating a surface of non-fibrous organic derivative of cellulose material selected from the group consisting of cellulose esters and cellulose ethers with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent having at least a softening action on said derivative of cellulose material.

8. Method of producing material having anti-fogging and anti-static properties, which comprises treating a surface of non-fibrous organic derivative of cellulose material selected from the group consisting of cellulose esters and cellulose ethers, containing residual non-permanent solvent employed in the manufacture thereof, with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent while some non-permanent solvent is still present in said organic derivative of cellulose.

9. Method of producing material having anti-fogging and anti-static properties, which comprises treating a surface of non-fibrous organic derivative of cellulose material selected from the group consisting of cellulose esters and cellulose ethers with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent having some solvent action on said organic derivative of cellulose.

10. Method of producing sheet material having anti-fogging and anti-static properties, which comprises treating the surface of a thin film of an organic derivative of cellulose selected from the group consisting of cellulose esters and cellulose ethers with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent having some solvent action on said organic derivative of cellulose.

11. Method of producing sheet material having anti-fogging and anti-static properties, which comprises treating the surface of a thin film of an organic derivative of cellulose selected from the group consisting of cellulose esters and cellulose ethers with a solution of a surface active substance, selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids, in an organic solvent having at least a softening action on said organic derivative of cellulose.

12. Method of producing material having anti-fogging and anti-static properties, which comprises treating a surface of non-fibrous cellulose acetate material with a solution of the dioctyl ester of sodium sulfo-succinate in a solvent therefor, said solvent having at least a softening action on the cellulose acetate.

13. Method of producing material having anti-fogging and anti-static properties, which comprises treating a surface of non-fibrous cellulose acetate material, containing residual non-permanent solvent employed in the manufacture thereof, with a solution of the dioctyl ester of sodium sulfo-succinate in a solvent therefor while some non-permanent solvent is still present in the cellulose acetate material.

14. Method of producing material having anti-fogging and anti-static properties, which comprises treating a surface of non-fibrous cellulose acetate material containing a plasticizer for the cellulose acetate with an alkyl aryl sulfonate wetting agent in a medium comprising an 80/20 mixture of pentane/toluol, said medium having a solvent action on said plasticizer.

15. A shaped article characterized by having anti-fogging and anti-static properties and comprising non-fibrous derivative of cellulose material selected from the group consisting of cellulose esters and cellulose ethers having embedded in at least the surface thereof a surface active substance selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids.

16. Sheet material characterized by having anti-fogging and anti-static properties and having a basis of a derivative of cellulose selected from the group consisting of cellulose esters and cellulose ethers, said sheet material having embedded in at least the surface thereof a surface active substance selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids.

17. A shaped article characterized by having anti-fogging and anti-static properties and comprising non-fibrous organic derivative of cellulose material selected from the group consisting of cellulose esters and cellulose ethers having embedded in at least the surface thereof a surface active substance selected from the group consisting of fatty alcohol sulfates, sulfated fatty acid esters, secondary alcohol sulfates, sulfated esters of higher alcohols and dibasic acids, alkyl aryl sulfonates and sulfonated esters of alcohols and dibasic acids.

18. Sheet material characterized by having anti-fogging and anti-static properties and having a basis of an organic derivative of cellulose selected from the group consisting of cellulose esters and cellulose ethers, said sheet material having embedded in at least the surface thereof a surface active substance selected from the group consisting of fatty alcohol sulfates, sulfated fatty acid esters, secondary alcohol sulfates, sulfated esters of high alcohols and dibasic acids, alkyl aryl sulfonates and sulfonated esters of alcohols and dibasic acids.

19. Sheet material characterized by having anti-fogging and anti-static properties and having a basis of cellulose acetate, said sheet material having embedded in at least the surface thereof the dioctyl ester of sodium sulfo-succinate.

20. Sheet material characterized by having anti-fogging and anti-static properties and having a basis of cellulose acetate, said sheet material having embedded in at least the surface thereof an alkyl aryl sulfonate wetting agent.

ERNEST SCHWEIZER.